United States Patent
Rubel (10) Patent No.: US 12,041,926 B2
(45) Date of Patent: Jul. 23, 2024

(54) WRIST BAND WITH INSECT REPELLANT

(71) Applicant: PIC Corporation, Linden, NJ (US)

(72) Inventor: Eric Rubel, Westfield, NJ (US)

(73) Assignee: PIC Corporation, Linden, NJ (US)

( * ) Notice: Subject to any disclaimer, the term of this patent is extended or adjusted under 35 U.S.C. 154(b) by 0 days.

(21) Appl. No.: 18/136,704

(22) Filed: Apr. 19, 2023

(65) Prior Publication Data

US 2023/0263152 A1     Aug. 24, 2023

Related U.S. Application Data

(63) Continuation of application No. 17/178,920, filed on Feb. 18, 2021, now Pat. No. 11,659,830.

(60) Provisional application No. 62/978,523, filed on Feb. 19, 2020.

(51) Int. Cl.
| | | |
|---|---|---|
| *A01M 29/12* | (2011.01) | |
| *A44C 5/00* | (2006.01) | |
| *A01N 25/34* | (2006.01) | |

(52) U.S. Cl.
CPC ............ *A01M 29/12* (2013.01); *A44C 5/0053* (2013.01); *A01N 25/34* (2013.01)

(58) Field of Classification Search
CPC ................ A44C 5/0053; A44C 5/0007; A44C 15/002; A44C 5/0023; A44C 5/003; A01N 25/34; A01N 25/16; A01M 29/12
USPC ......................................................... 424/416
See application file for complete search history.

(56) References Cited

U.S. PATENT DOCUMENTS

| | | | |
|---|---|---|---|
| 2,205,711 A | | 6/1940 | Banks |
| 2,401,253 A | | 5/1946 | Lamb, Jr. |
| 2,538,265 A | * | 1/1951 | Paston .................. A44C 5/0053 24/DIG. 46 |
| 3,811,413 A | * | 5/1974 | Scherpenborg ....... A01K 27/007 514/134 |
| 3,814,061 A | | 6/1974 | Aries et al. |
| 4,047,505 A | * | 9/1977 | McAndless ........... A01K 27/007 424/125 |
| 4,224,901 A | | 9/1980 | Carey, Jr. |
| 5,555,848 A | | 9/1996 | Trujillo et al. |
| 9,491,991 B1 | | 11/2016 | Rong et al. |
| 2006/0201054 A1 | | 9/2006 | Katsuura et al. |
| 2009/0265971 A1 | * | 10/2009 | Cook ....................... G09F 3/005 224/267 |
| 2010/0272767 A1 | | 10/2010 | Koele et al. |
| 2010/0331145 A1 | * | 12/2010 | Lakovic ................. G04G 17/04 482/8 |
| 2011/0120392 A1 | * | 5/2011 | Smith .................... A01K 27/007 119/856 |
| 2012/0315317 A1 | | 12/2012 | O'Hara |
| 2013/0095162 A1 | | 4/2013 | Quinn |

(Continued)

FOREIGN PATENT DOCUMENTS

WO     2014-154955 A1     10/2014

OTHER PUBLICATIONS

International Search Report and Written Opinion dated May 13, 2021 issued in PCT International Application No. PCT/US2021/018541.

*Primary Examiner* — Jack W Lavinder
(74) *Attorney, Agent, or Firm* — Amster, Rothstein & Ebenstein LLP (57) ABSTRACT

The present invention relates to a wrist band or other wearable accessory that includes insect repelling material.

18 Claims, 8 Drawing Sheets

(56) References Cited

U.S. PATENT DOCUMENTS

2015/0265034 A1\* 9/2015 Lee ........................... A45F 5/00
224/219
2021/0379618 A1 12/2021 Botton et al.

\* cited by examiner

WRIST BAND WITH INSECT REPELLANT

CROSS-REFERENCE TO RELATED APPLICATIONS

The present application is a continuation of U.S. patent application Ser. No. 17/178,920, filed Feb. 18, 2021, which claims benefit of and priority to U.S. Provisional Application No. 62/978,523 filed Feb. 19, 2020 entitled WRIST BAND WITH INSECT REPELLANT, the entire content of which is incorporated by reference herein.

BACKGROUND

Field of the Disclosure

The present invention generally relates to pest management. More specifically, the present invention relates to a wrist band or other accessory configured to be worn by a user including insect repelling material.

Related Art

During mild or otherwise pleasant weather, many people enjoy spending additional time outside. One drawback of spending time outdoors, however, is that insect activity often increases when the weather is pleasant. In some cases, the increase in the number of people in the outdoors may attract insects. Conventional insect repelling material such as sprays are generally ineffective as they tend to dissipate quickly and may stain or damage clothing.

Accordingly, it would be useful to provide an insect repelling device or element that avoids these and other problems.

SUMMARY

An object of the present invention is to provide a wrist band or other wearable accessory that includes insect repelling material.

A wearable band in accordance with an embodiment of the present disclosure includes: a flexible inner layer including an inner surface configured to contact a user's skin when the wearable band is in a closed position; a middle layer positioned on the flexible inner layer on a side opposite the inner surface of the flexible inner layer, the middle layer including insect repelling material; a flexible outer layer positioned on the middle layer on a side opposite the flexible inner layer; at least one protrusion extending upward from a top surface of the flexible outer layer; and at least one opening formed through the flexible inner layer, the middle layer and the flexible outer layer and configured to receive the at least one protrusion when the wearable band is in the closed position.

In embodiments, the wearable band may include a backing element positioned opposite the at least one protrusion.

In embodiments, the backing element may be connected to the inner surface of the flexible inner layer.

In embodiments, the backing element may be integrated into the interior surface of the flexible inner layer.

In embodiments, the at least one protrusion has a first width at a top portion thereof and a second width at a bottom portion thereof, wherein the first width is larger than the second width.

In embodiments, the at least one second opening has a first diameter that is less than the first width and wherein the at least one opening is configured to stretch to allow the first width of the top portion of the at least one protrusion to pass therethrough and to retract around the second diameter of the lower portion of the at least one protrusion.

In embodiments, the middle layer includes a foam material including the insect repelling material.

In embodiments, the middle layer includes one or more chambers formed therein including the insect repelling material.

In embodiments, at least one side of the one or more chambers is uncovered such that vapors of the insect repelling material pass out the at least one side of the one or more chambers.

In embodiments, at least one side of the wearable band is open such that vapors of the insect repelling material pass out of the wearable band.

A wearable band in accordance with another embodiment of the present disclosure includes: a flexible inner layer including an inner surface configured to contact a user's skin when the wearable band is in a closed position; a middle layer positioned on the flexible inner layer on a side opposite the inner surface of the flexible inner layer, the middle layer including insect repelling material; a flexible outer layer positioned on the middle layer opposite the flexible inner layer, the flexible outer layer including a first plurality of openings formed in a top surface thereof and continuing to a bottom surface thereof such that vapors of the insect repelling material pass through the first plurality of openings; at least one protrusion extending upward from a top surface of the flexible outer layer; and at least one second opening formed through the flexible inner layer, the middle layer and the flexible outer layer and configured to receive the at least one protrusion.

In embodiments, the wearable band includes a backing element positioned opposite the at least one protrusion.

In embodiments, the backing element may be connected to an interior surface of the flexible inner layer.

In embodiments, the backing element may be integrated into the interior surface of the flexible inner layer.

In embodiments, the at least one protrusion has a first width at a top portion thereof and a second width at a bottom portion thereof, wherein the first width is larger than the second width.

In embodiments, the at least one second opening has a first diameter that is less than the first width and wherein the at least one second opening is configured to stretch to allow the first width of the top portion of the at least one protrusion to pass therethrough and to retract around the second diameter of the lower portion of the at least one protrusion.

In embodiments, the middle layer includes a foam material including the insect repelling material.

In embodiments, the middle layer includes one or more chambers formed therein including the insect repelling material.

In embodiments, at least one side of the one or more chambers is uncovered such that vapors of the insect repelling material pass out of the at least one side of the one or more chambers.

In embodiments, the wearable band includes at least one side element extending between the flexible inner layer and flexible outer layer.

This and other objects shall be addressed by embodiments of the present invention as set forth herein.

BRIEF DESCRIPTION OF THE DRAWINGS

Exemplary embodiments of the present invention will be described with references to the accompanying figures, wherein.

DETAILED DESCRIPTION

Figure 1:
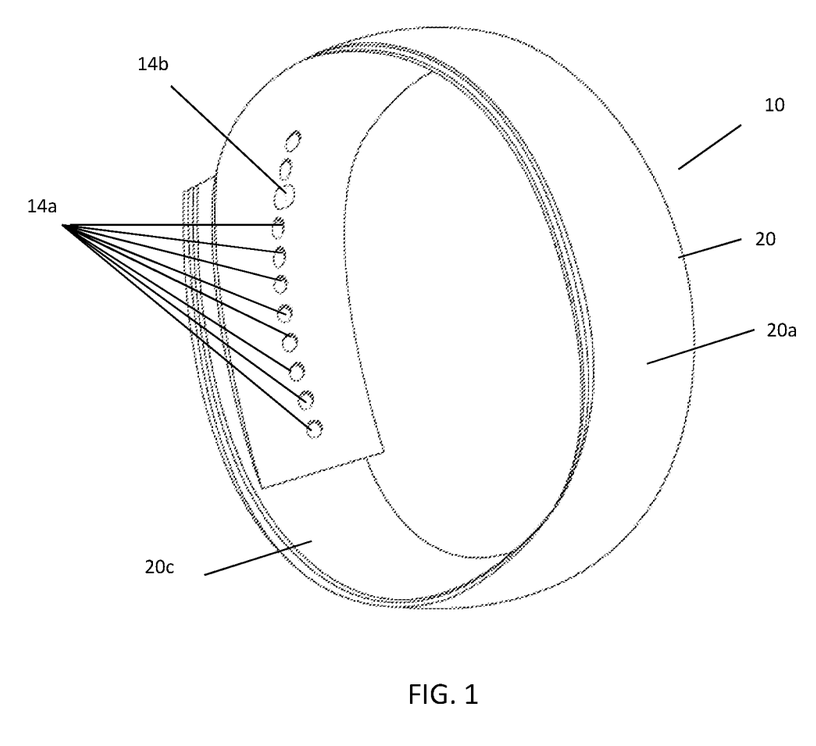
FIG. 1 illustrates a wrist band including insect repelling material in a closed configuration in accordance with an embodiment of the present disclosure.

The present invention generally relates to a wrist band 10 including an insect repelling material. While the term "wrist band" is used herein, the band 10 may be worn on other parts of the user's body and is not limited to use on the user's wrist. In embodiments, the wrist band 10 may be any accessory wearable by a user. Further, the band 10 may be carried by the user, for example, in a user's pocket or attached to the user's clothes, for example, without being worn. In embodiments, the wrist band 10 may include a body 20 that includes multiple layers 20a, 20b, 20c. In embodiments, the outer layer 20a may be configured to face outward, away from a user's body when the wrist band 10 is in a closed configuration on a portion of the user's body as shown in FIG. 1, for example. In embodiments, the outer layer 20a may be made of vinyl, or another durable and flexible material. In embodiments, the outer layer 20a encases and protects the insect repelling material 22 provided in the middle layer 20b. In embodiments, the outer layer 20a may include a plurality of openings 14a that extend therethrough as well as the middle layer 20b and the inner layer 20c to accommodate a fastening protrusion 14b extending from an inner surface of the inner layer 20c to secure the wrist band 10 in the closed configuration. In embodiments, the plurality of openings 14a may extend through all of the layers 20a, 20b and 20c. In embodiments, the inner layer 20c similarly aid in encasing and protecting the insect repelling material 22 in the middle layer 20b. In addition, the inner layer 20c provides a barrier between the insect repelling material 22 provided in the middle layer 20b and the user's skin. In embodiments, the inner layer 20c may also be made of vinyl or any other flexible and durable material. In embodiments, the inner layer 20c is preferably made of a flexible material that is suitable for contact with the user's skin.

Figure 2:
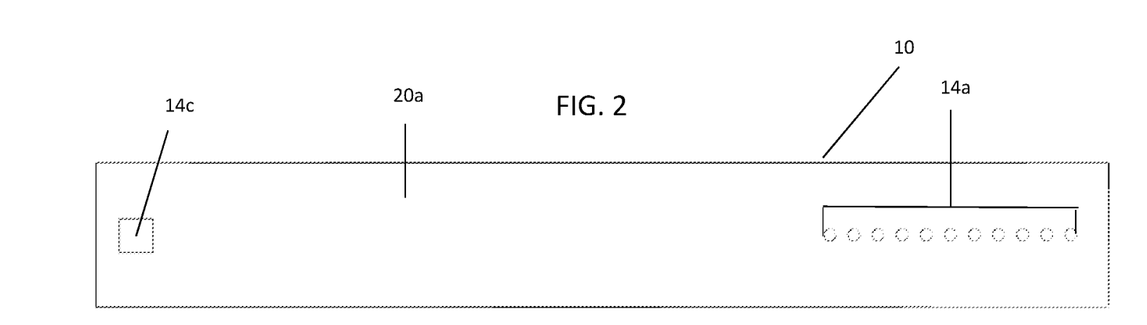
FIG. 2 illustrates a top view of the wrist band of FIG. 1 in an open position in accordance with an embodiment of the present disclosure.
Figure 3:
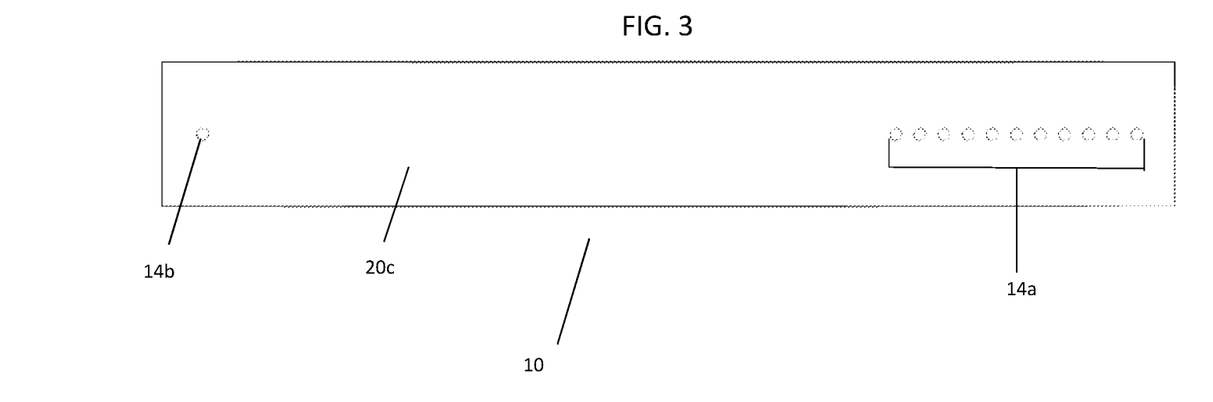
FIG. 3 illustrates a bottom view of the wrist band of FIG. 1 in an open configuration in accordance with an embodiment of the present disclosure.
Figures 4, 5:
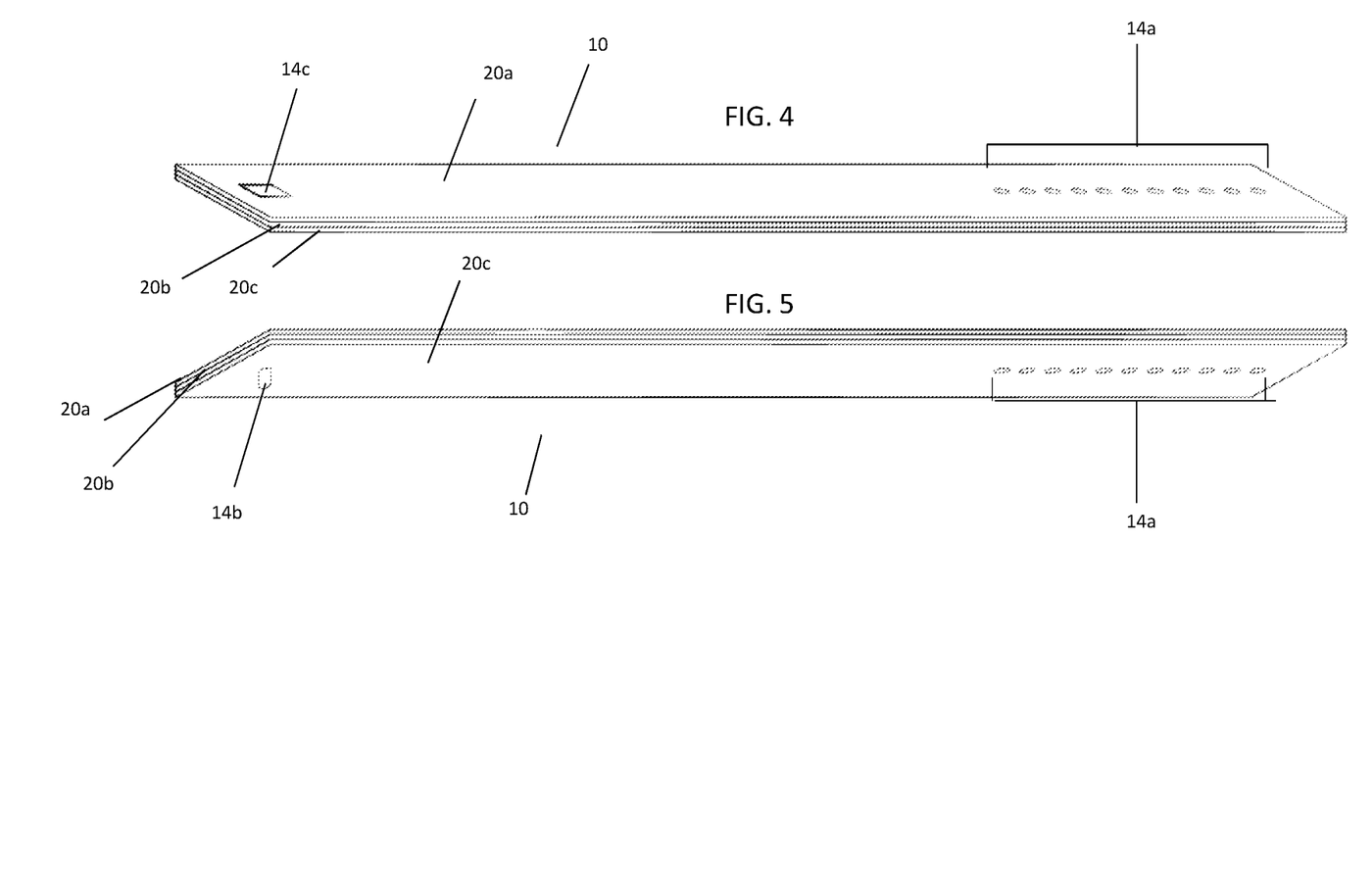
FIG. 4 is a top perspective view of the wrist band of FIG. 1 in an open configuration in accordance with an embodiment of the present disclosure.
FIG. 5 is bottom perspective view of the wrist band of FIG. 1 in an open configuration in accordance with an embodiment of the present disclosure.
Figure 6:
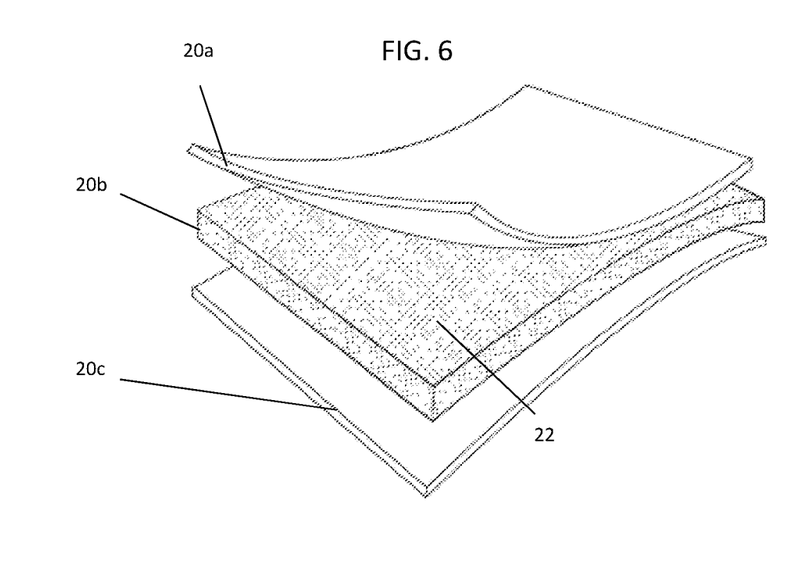
FIG. 6 illustrates a more detailed view of the layers included in a body of the wrist band of FIGS. 1-6 in accordance with an embodiment of the present disclosure.

In embodiments, the inner layer 20c may include a backing element 14c (see FIGS. 2 and 4, for example) positioned opposite the fastening protrusion 14b on a bottom surface of the inner layer. In embodiments, a user may press on the backing element 14c to aid in positioning the fastening protrusion 14b through one of the openings 14a to secure the wrist band 10 in the closed configuration. In embodiments, the backing element 14c may be made of a different material than the inner layer 20c. In embodiments, the backing element 14c may be made of a material that is harder, or less flexible than that of the inner layer 20c. In embodiments, the backing element 14c may be connected to the inner surface of the inner layer 20c. In embodiments, the backing element 14c may be integrated into the inner surface of the inner layer 20c. In embodiments, the fastening protrusion 14b may be wider on a top portion thereof than on the bottom portion such that it stays within the respective opening 14a to hold the wrist band 10 in the closed configuration once it is positioned in the opening. In embodiments, the top portion of the protrusion 14b may have a somewhat different shape than that of the bottom portion and the opening 14a such that the protrusion stays in place in the opening. In embodiments, the respective opening 14a may flex or stretch to accommodate the larger or differently shaped top portion of the protrusion 14b.

In embodiments, the layers 20a, 20b, 20c may be made of a material that is sufficiently elastic to expand slightly to allow the top portion of the fastening protrusion 14b through as it is pressed into the opening 14a and resilient such that once the wider portion passes through, the opening returns to its original position and resists removal of the protrusion 14b.

Figure 8:
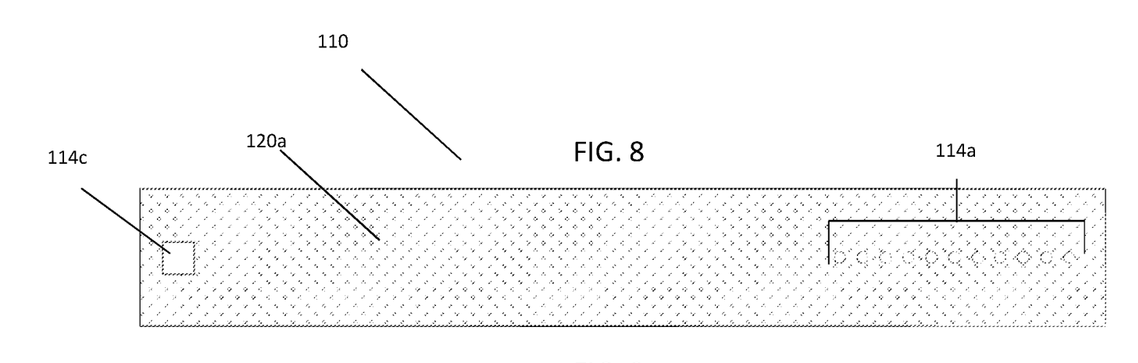
FIG. 8 illustrates a top view of the wrist band of FIG. 7 in an open configuration in accordance with an embodiment of the present disclosure.
Figure 9:
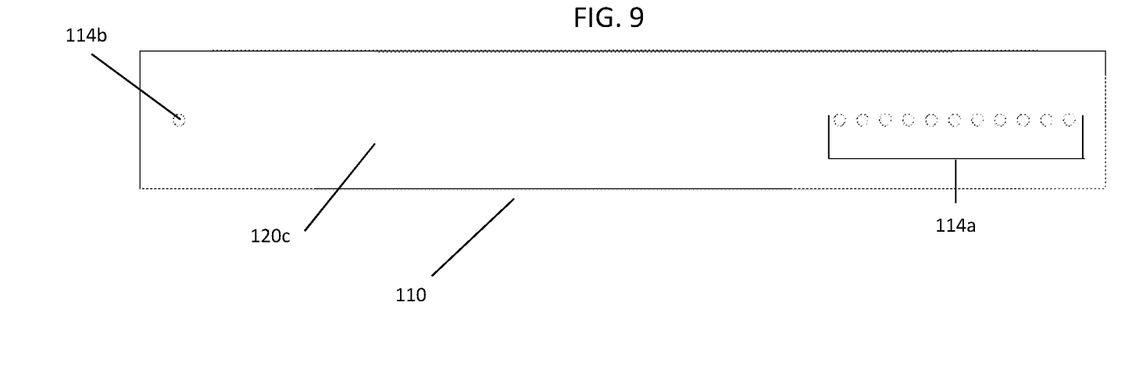
FIG. 9 illustrates a bottom view of the wrist band of FIG. 7 in an open configuration in accordance with an embodiment of the present disclosure.

In embodiments, the insect repelling material 22 may be provided as the middle layer 20b of the body 20. That is, in embodiments, the middle layer 20b may be made of the insect repelling material 22. In embodiments, the insect repelling material 22 may be incorporated into another material in the middle layer 20b. In embodiments, the middle layer 20b may be made of an absorbent material and the insect repelling material 22 may be held within the absorbent material. In embodiments, the absorbent material may be foam or any other suitable material. In embodiments, the middle layer 20b may be made of vinyl or plastic or another material and coated with insect repelling material 22. In embodiments, the middle layer 20b may include one or more storage chambers and/or openings formed in the surface thereof which may receive the insect repelling material 22. In embodiments, at least one side of these chambers may be left open to allow vapors of the insect repelling material to escape the band 10. In embodiments, the insect repelling material may be or may include Metofluthrin or Transfluthrin, to name a few. In embodiments, the insect repelling material 22 may be a volatile substance such that it easily evaporates and spreads around the wrist band 10. In embodiments, the heat of a user's skin or body may be sufficient to increase evaporation of the insect repelling material 22. FIG. 8 illustrates a detailed view of exemplary embodiment of the layers 20a, 20b, 20c used in the body 20.

In embodiments, the body 20 may not include any sort of side elements or extensions such that the middle layer 20b is visible and exposed from the side. In embodiments, the vapors of the insect repelling material 22 escape the body 20 via the open sides into the air surrounding the user. In this manner, the insect repelling material expands around the user to create a substantially insect free zone around the user.

Figure 7:
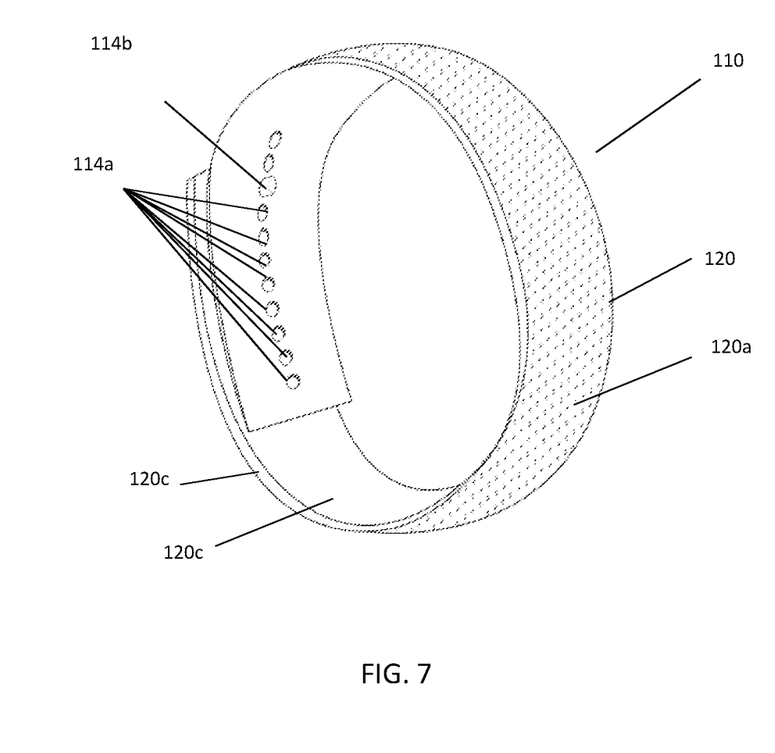
FIG. 7 illustrates a wrist band including insect repelling material in a closed position in accordance with another embodiment of the present disclosure.

FIG. 7 illustrates an exemplary embodiment of a wrist band 110 in accordance with another embodiment of the present disclosure. In embodiments, the wrist band 110 is similar to wrist band 10 discussed above. The wrist band 110 may also be used on other body parts and is not limited to use on the user's wrist. In embodiments, the wrist band 110 may include a body 120 with an outer layer 120a that may be used to enclose and protect a middle layer 120b that is or includes insect repelling material 22. In embodiments, the outer layer 120a may be made of the same materials as the outer layer 20a. In embodiments, the outer layer 120a may include a plurality of vapor openings 120d that are formed therethrough such that vapors from the insect repelling material included in the middle layer 120b may pass through the vapor openings 120d and out of the band 110. In embodiments, an inner layer 120a may be positioned between the user's skin and the middle layer 120b and may be made of the same materials as the inner layer 20c discussed above.

Like the fastening openings 14a discussed above, fastening openings 114a may pass through all three layers 120a, 120b, 120c of the body 120 and may receive the fastening protrusion 114b to hold the wrist band 110 in the closed configuration when desired. In embodiments, the fastening protrusion 114b may be wider on top than on the bottom, like the protrusion 14b, and the openings 114a may flex or stretch to accommodate the wider portion and then return to their original shape or substantially to their original shape to resist removal of the protrusion. In embodiments, the outer layer 120a may include a backing element 114c positioned opposite the protrusion 114b to aid in pushing the protrusion into a respective opening 114a, similar to backing element 14c discussed above.

Figure 10:
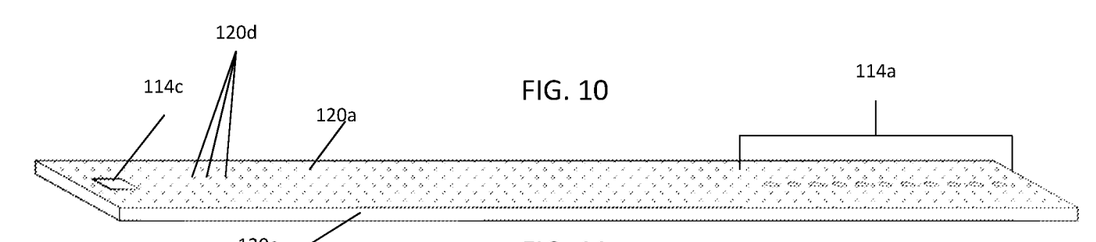
FIG. 10 is a top perspective view of the wrist band of FIG. 7 in an open configuration in accordance with an embodiment of the present disclosure.
Figure 11:
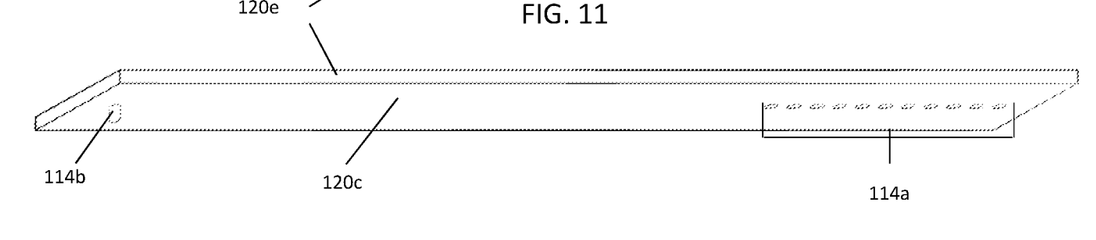
FIG. 11 is bottom perspective view of the wrist band of FIG. 7 in an open configuration in accordance with an embodiment of the present disclosure.
Figure 12:
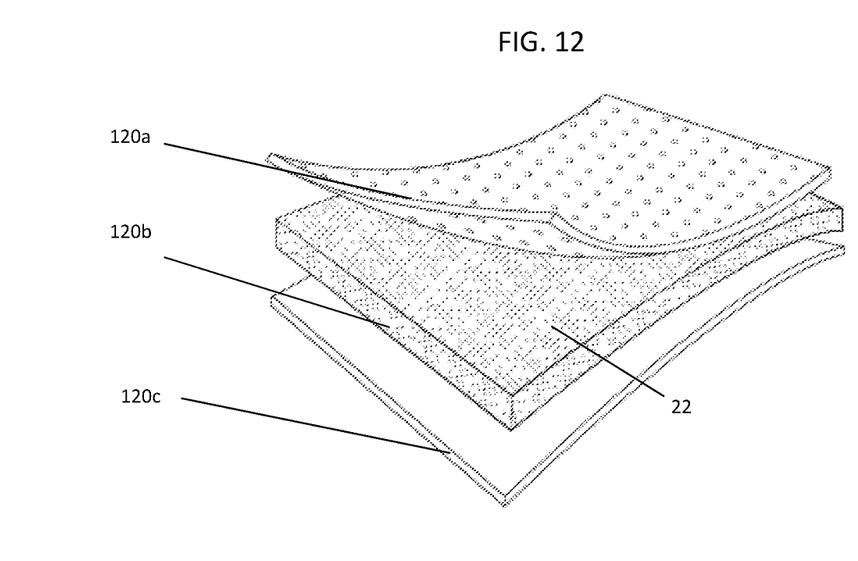
FIG. 12 illustrates a more detailed view of the layers included in a body of the wrist band of FIGS. 7-11 in accordance with an embodiment of the present disclosure.

In embodiments, as can be seen in FIGS. 10 and 11, the middle layer 120b may be covered by a side portion 120e of either the outer layer 120a or inner layer 120c such that the middle layer is substantially completely covered. In embodiments, the middle layer 120b may be covered by a side portion 120e that may be attached to one or both the outer layer 120a and the inner layer 120c. In such an embodiment, the insect repelling material 22 escapes through the openings 120d formed in the outer layer 120a. In embodiments, the middle layer 120b may be configured in substantially the same way and made of the same materials as the middle layer 20b discussed above.

While the present disclosure refers to a wrist band 10, 110, as noted above, the band 10, 110 may be applied to other parts of a user's body and is not limited to use on the user's wrist. In embodiments, the wrist band 10, 110 may be used in the closed configuration illustrated in FIGS. 1 and 7 where it is wrapped around a part of the user's body, or in the open configuration illustrated in FIGS. 2-5 and 8-11. In embodiments, in the open configuration, the wrist band 10, 110 may be placed in a user's pocket or hang from the user's clothing or otherwise be carried by the user.

In use, a user may wrap the body 20, 120 of the wrist band 10, 110 around their wrist, or another body part, and insert the protrusion 14b, 114b into a respective opening 14a, 114a to hold it in place. As discussed above, the shape of the protrusion 14b, 114b may allow it to be received in the respective opening 14a, 114a and to resist removal. A plurality of openings 14a, 114a are provided to accommodate a wide variety of sizes. Where the wrist band 10, 110 is being used in its open configuration, it may not be necessary to insert the protrusion 14b, 114b through any of the openings 14a, 114a.

The band 10, 110 is configured to be easily worn by a user and to continuously emit a more or less constant amount of vapor of the insect repelling material 22 to provide a substantially insect free zone around the user. This allows for long lasting and effective insect repelling with minimal mess. While the band 10, 110 is generally referred to as a wrist band, as noted above, the band need not be worn on a user's wrist and may be worn on other parts of the user's body. As noted above, the band 10, 110 may also be used in an open configuration and placed in a user's pocket, hung from the user's clothes or otherwise caned by or on the user.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A wearable band comprises:
   a flexible inner layer including an inner surface configured to contact a user's skin when the wearable band is in a closed position;
   a middle layer positioned on the flexible inner layer on a side opposite the inner surface of the flexible inner layer, the middle layer including insect repelling material and exposed on either side thereof along a length of the middle layer allowing insect repelling material to pass out either side;
   a flexible outer layer positioned on the middle layer on a side opposite the flexible inner layer; and
   at least one fastener provided on a top surface of the flexible outer layer and configured to connect to an opposite end of the band when the wearable band is in the closed position.

2. The wearable band of claim 1, further comprising a backing element positioned opposite the at least one protrusion.

3. The wearable band of claim 2, wherein the backing element is connected to the inner surface of the flexible inner layer.

4. The wearable band of claim 2, wherein the backing element is integrated into the inner surface of the flexible inner layer.

5. The wearable band of claim 1, wherein the at least one protrusion has a first width at a top portion thereof and a second width at a bottom portion thereof, wherein the first width is larger than the second width.

6. The wearable band of claim 1, wherein the middle layer comprises a foam material including the insect repelling material.

7. The wearable band of claim 1, wherein the middle layer comprises one or more chambers formed therein including the insect repelling material.

8. The wearable band of claim 7, wherein at least one side of the one or more chambers is uncovered such that vapors of the insect repelling material pass out the at least one side of the one or more chambers.

9. The wearable band of claim 1, wherein at least one side of the wearable band is open such that vapors of the insect repelling material pass out of the wearable band.

10. A wearable band comprises:
a flexible inner layer including an inner surface configured to contact a user's skin when the wearable band is in a closed position;
a middle layer positioned on the flexible inner layer on a side opposite the inner surface of the flexible inner layer, the middle layer including insect repelling material and exposed on either side thereof along a length of the middle layer allowing insect repelling material to pass out either side;
a flexible outer layer positioned on the middle layer opposite the flexible inner layer, where at least one of the flexible inner layer and the flexible outer layer includes a first plurality of openings such that vapors of the insect repelling material pass through the first plurality of openings; and
at least one fastener on a top surface of the flexible outer layer and configured to connect to an opposite end of the band when the wearable band is in the closed position.

11. The wearable band of claim 10, further comprising a backing element positioned opposite the at least one protrusion.

12. The wearable band of claim 11, wherein the backing element is connected to an interior surface of the flexible inner layer.

13. The wearable band of claim 11, wherein the backing element is integrated into the interior surface of the flexible inner layer.

14. The wearable band of claim 10, wherein the at least one protrusion has a first width at a top portion thereof and a second width at a bottom portion thereof, wherein the first width is larger than the second width.

15. The wearable band of claim 10, wherein the middle layer comprises a foam material including the insect repelling material.

16. The wearable band of claim 10, wherein the middle layer comprises one or more chambers formed therein including the insect repelling material.

17. The wearable band of claim 16, wherein at least one side of the one or more chambers is uncovered such that vapors of the insect repelling material pass out of the at least one side of the one or more chambers.

18. The wearable band of claim 10, further comprising at least one side element extending between the flexible inner layer and flexible outer layer.

* * * * *